(12) United States Patent
Diot et al.

(10) Patent No.: US 12,355,651 B2
(45) Date of Patent: Jul. 8, 2025

(54) SCALABLE AND LOW COMPUTATION COST METHOD FOR OPTIMIZING SAMPLING/PROBING IN A LARGE SCALE NETWORK

(71) Applicant: Google LLC, Mountain View, CA (US)

(72) Inventors: Christophe Diot, Palo Alto, CA (US); Muhammad Jehangir Amjad, Redwood, CA (US); Branislav Kveton, San Jose, CA (US); Dimitris Konomis, Boston, MA (US); Augustin Soule, San Francisco, CA (US); Xiaolong Yang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 659 days.

(21) Appl. No.: 17/563,206

(22) Filed: Dec. 28, 2021

(65) Prior Publication Data
US 2023/0164054 A1   May 25, 2023

(30) Foreign Application Priority Data
Nov. 22, 2021 (GR) .............................. 20210100818

(51) Int. Cl.
*H04L 43/12* (2022.01)
*H04L 43/0882* (2022.01)

(52) U.S. Cl.
CPC .......... *H04L 43/12* (2013.01); *H04L 43/0882* (2013.01)

(58) Field of Classification Search
CPC ..................................................... H04L 43/12
See application file for complete search history.

(56) References Cited

U.S. PATENT DOCUMENTS

| | | | | |
|---|---|---|---|---|
| 8,614,946 B1* | 12/2013 | Noble | ................. | H04L 43/0882 370/230.1 |
| 2011/0069773 A1* | 3/2011 | Doron | ................. | H04B 7/0417 375/267 |
| 2015/0029870 A1* | 1/2015 | Bisdikian | ................ | H04L 43/12 370/250 |
| 2015/0334030 A1* | 11/2015 | Vasseur | ................. | H04L 47/115 370/252 |

(Continued)

OTHER PUBLICATIONS

Boyd and Vandenberghe. 2004. Convex Optimization. Cambridge University Press, USA. 730 pages.

(Continued)

*Primary Examiner* — Guang W Li
(74) *Attorney, Agent, or Firm* — Lerner David LLP (57) ABSTRACT

Systems and techniques are provided for monitoring of a large-scale network, such as a large-scale network supporting cloud infrastructures. A minimum fixed probe allocation and/or a sampling budget for monitoring may be set. A probing and/or sampling strategy may be optimized in order to measure network metrics, such as error metrics associated with the latency of a network, with a known accuracy, given a particular probe allocation. The systems and techniques provided may leverage particular designs to determine efficient probing strategies for the network, while simultaneously conserving computing resources. In some examples, instead of using these frameworks and techniques directly in production networks, a scalable and near optimal approximation technique based on the Frank-Wolfe algorithm may be used.

19 Claims, 5 Drawing Sheets

(56) References Cited

U.S. PATENT DOCUMENTS

| | | | | |
|---|---|---|---|---|
| 2016/0028568 | A1* | 1/2016 | Kirsch | H04L 27/0006 375/340 |
| 2016/0173341 | A1* | 6/2016 | Bisdikian | H04L 43/0876 370/254 |
| 2018/0109428 | A1* | 4/2018 | Kattepur | H04W 4/70 |
| 2018/0309636 | A1* | 10/2018 | Strom | H04L 41/147 |
| 2019/0104426 | A1* | 4/2019 | Singhal | H04L 12/4633 |
| 2020/0183339 | A1* | 6/2020 | Shi | G06N 3/048 |
| 2020/0234167 | A1* | 7/2020 | Xiao | G06N 7/01 |
| 2020/0374200 | A1* | 11/2020 | Strom | H04L 43/0882 |
| 2021/0081828 | A1* | 3/2021 | Lopez De Prado | G06N 7/01 |

OTHER PUBLICATIONS

Bu et al. 2002. Network Tomography on General Topologies. Sigmetrics Perform. Eval. Rev. 30, 1 (Jun. 2002), 21-30. https://doi.org/10.1145/511399.511338.

Cantieni et al. 2006. Reformulating the Monitor Placement Problem: Optimal Network-Wide Sampling. In 2006 40th Annual Conference on Information Sciences and Systems. 12 pages. https://doi.org/10.1109/CISS.2006.286433.

Chen et al. 1999. Strong Consistency of Maximum Quasi-Likelihood Estimators in Generalized Linear Models with Fixed and Adaptive Designs. The Annals of Statistics 27, 4 (1999), 1155-1163.

Diamond and Boyd. 2016. Cvxpy: A Python-Embedded Modeling Language for Convex Optimization. Journal of Machine Learning Research (2016). 5 pages. http://stanford.edu/~boyd/papers/pdf/cvxpy_paper.pdf.

Duffield. 2004. Sampling for Passive Internet Measurement: A Review. Statist. Sci. 19, 3 (Aug. 2004), 472-498. https://doi.org/10.1214/088342304000000206.

Ghita et al. 2013. Toward Accurate and Practical Network Tomography. SIGOPS Oper. Syst. Rev. 47, 1 (Jan. 2013), 22-26. https://doi.org/10.1145/2433140.2433146.

Ghita et al. 2010. Netscope: Practical Network Loss Tomography. In 2010 Proceedings IEEE INFOCOM. 1-9. https://doi.org/10.1109/INFCOM.2010.5461918.

He et al. 2015. Fisher Information-Based Experiment Design for Network Tomography. SIGMETRICS Perform. Eval. Rev. 43, 1 (Jun. 2015), 389-402. https://doi.org/10.1145/2796314.2745862.

Huang et al. 2018. Sketchlearn: Relieving User Burdens in Approximate Measurement with Automated Statistical Inference. In Proceedings of the 2018 Conference of the ACM Special Interest Group on Data Communication (SIGCOMM '18). Association for Computing Machinery, New York, NY, USA, 576-590. https://doi.org/10.1145/3230543.3230559.

Huang et al. 2008. Practical Issues with Using Network Tomography for Fault Diagnosis. SIGCOMM Comput. Commun. Rev. 38, 5 (Sep. 2008), 53-58. https://doi.org/10.1145/1452335.1452343.

Li et al. 2016. FlowRadar: A Better NetFlow for Data Centers. In 13th USENIX Symposium on Networked Systems Design and Implementation (NSDI 16). USENIX Association, Santa Clara, CA, 311-324. https://www.usenix.org/conference/nsdi16/technical-sessions/presentation/li-yuliang.

Liu et al. 2019. NitroSketch: Robust and General Sketch-Based Monitoring in Software Switches. In Proceedings of the ACM Special Interest Group on Data Communication (SIGCOMM '19). Association for Computing Machinery, New York, NY, USA, 334-350. https://doi.org/10.1145/3341302.3342076.

Liu et al. 2016. One Sketch to Rule Them All: Rethinking Network Flow Monitoring with UnivMon. In Proceedings of the 2016 ACM SIGCOMM Conference (SIGCOMM '16). Association for Computing Machinery, New York, NY, USA, 101-114. https://doi.org/10.1145/2934872.2934906.

Mccullagh and Nelder. 1989. Generalized Linear Models. Chapman & Hall, 526 pages.

Moshref et al. 2016. Trumpet: Timely and Precise Triggers in Data Centers. In Proceedings of the 2016 ACM SIGCOMM Conference (SIGCOMM '16). Association for Computing Machinery, New York, NY, USA, 129-143. https://doi.org/10.1145/2934872.2934879.

Tan et al. 2019. NetBouncer: Active Device and Link Failure Localization in Data Center Networks. In 16th USENIX Symposium on Networked Systems Design and Implementation (NSDI 19). USENIX Association, Boston, MA, 599-613. https://www.usenix.org/conference/nsdi19/presentation/tan.

Tsang et al. 2001. Passive network tomography using EM algorithms. In 2001 IEEE International Conference on Acoustics, Speech, and Signal Processing. Proceedings (Cat. No. 01CH37221), vol. 3. 1469-1472. https://doi.org/10.1109/ICASSP.2001.941208.

Vandenberghe and Boyd. 1999. Applications of Semidefinite Programming. Applied Numerical Mathematics 29, 3(1999), 283-299.

Yang et al. 2018. Elastic Sketch: Adaptive and Fast Network-Wide Measurements. In Proceedings of the 2018 Conference of the ACM Special Interest Group on Data Communication (SIGCOMM '18). Association for Computing Machinery, New York, NY, USA, 561-575. https://doi.org/10.1145/3230543.3230544.

Tsang et al. 2003. Network Delay Tomography. IEEE Transactions on Signal Processing 51, 8 (2003), 2125-2136. https://doi.org/10.1109/TSP.2003.814520.

Zhu et al. 2015. Packet-Level Telemetry in Large Datacenter Networks. SIGCOMM Comput. Commun. Rev. 45, 4 (Aug. 2015), 479-491. https://doi.org/10.1145/2829988.2787483.

Petersen and Pedersen. 2012. The Matrix Cookbook. (Nov. 2012). 72 pages. http://www2.compute.dtu.dk/pubdb/pubs/3274-full.html.

Hastie et al. 2001. The Elements of Statistical Learning. Springer New York Inc., New York, NY, USA. 764 pages.

Duffield et al. 2001. Inferring Link Loss Using Striped Unicast Probes. In Proceedings IEEE INFOCOM 2001. Conference on Computer Communications. Twentieth Annual Joint Conference of the IEEE Computer and Communications Society (Cat. No. 01CH37213), vol. 2. 11 pages. <https://doi.org/10.1109/INFOCOM.2001.916283>.

Nguyen et al. 2009. Minimizing Probing Cost for Detecting Interface Failures: Algorithms and Scalability Analysis. In IEEE INFOCOM 2009. pp. 1386-1394. <https://doi.org/10.1109/INFCOM.2009.5062054>.

Frank and Wolfe. 1956. An Algorithm for Quadratic Programming. Naval Research Logistics Quarterly 3, 1-2 (1956), pp. 95-110.

* cited by examiner

SCALABLE AND LOW COMPUTATION COST METHOD FOR OPTIMIZING SAMPLING/PROBING IN A LARGE SCALE NETWORK

CROSS-REFERENCE TO RELATED APPLICATIONS

The present application claims priority from Greek Patent Application No. 20210100818 filed Nov. 22, 2021, the disclosure of which is hereby incorporated herein by reference.

BACKGROUND

Monitoring of large-scale networks, such as those supporting cloud infrastructures, may be a complex and popular problem. Most recent systems make two assumptions in order to acquire accurate measurements when monitoring such networks. These assumptions include: (1) that the CPU and memory are given a fixed budget for monitoring, and (2) that most network flows can be covered using this budget. In practice, however, reserving a fixed amount of resources for monitoring and full coverage may be infeasible at the scale at which large-scale networks, such as major cloud infrastructure networks, operate. This may make it difficult to know the accuracy of the estimated metrics. Moreover, many conventional frameworks and techniques for monitoring networks, and for determining the placement of network probes to be used in the monitoring, may be computationally inefficient and may not scale.

BRIEF SUMMARY

The monitoring of large-scale networks, such as those supporting cloud infrastructures, may involve setting a fixed budget for monitoring. The budget, sometimes referred to as a probe budget, may be defined as a maximum number of network probes. Instead of assuming that the CPU and memory are given a fixed budget for monitoring and most network flows can be covered using this budget, the framework and techniques, as described herein, optimize the probing strategy in order to measure network metrics with a known accuracy, given a particular probe budget. The framework and techniques, as described herein, may leverage A- and E-optimal experimental designs in statistics to determine the optimal probing strategy. In some examples, instead of using these frameworks and techniques directly in production networks, a scalable and near optimal implementation based on the Frank-Wolfe algorithm may be used.

The framework and techniques may be validated using experimentation, whereby the framework and techniques may be simulated using real network topologies where the latency and loss are generated using idealized models. Empirical evaluation of the implementation of the framework and techniques may be performed using a production probing system in a large cloud network to measure latency and loss. Major gains in reducing the probing budget, while maintaining low error on estimates, even with very low probing budgets may be achieved using the framework and techniques, as described herein.

In some examples, the framework and techniques, as described herein, may model networks paths as a structure of interest. In some examples, a path may be viewed as a collection of links, such as hops between routers, or more abstractly as a feature vector with path characteristics. Using such a model may allow for the formulation of an optimization problem in which the estimation error for a metric of interest, such as the maximum error in estimating latency across all paths, may be minimized subject to measurement constraints, such as probing and/or sampling budgets, at each node in the network. Here, the estimation error may be the average or maximum estimation error. The solution of the optimization problem may be an optimal probe allocation vector that corresponds to a sampling and/or probing frequency for each path in the network.

In some examples, the framework and techniques, as described herein, may include two linear models with properties that allow for the estimation of network latency and loss. In some examples, the framework and techniques, as described herein, may use linear regression. In these examples, the optimal allocation of measurement probes/samples, along network paths, may be determined, without prior observations, as a function of the features of the paths. In some examples, the framework and techniques, as described herein, may use a generalized linear model instead of a linear model. This model may allow for the application of the same principles of optimal design as in linear models. In some examples, a general reduction of a non-linear model may be made. This may allow for the estimation of network properties beyond network latency and loss.

In some examples, an approximation algorithm inspired by the Frank-Wolfe algorithm may be used rather than A- and E-optimal design. This approximation algorithm may be near-optimal or optimal and may be implemented in a scalable manner in very large networks. The use of such framework and techniques, as described herein, may be scalable and improve the computational efficiency and speed with which any computing system and/or network resources, implementing such framework and techniques, may solve for an optimal probe allocation vector when compared to conventional frameworks and techniques. As such, when compared to conventional frameworks and techniques, the use of the framework and techniques, as described herein, may reduce power consumption and increase the available bandwidth of any computing system and/or network resources implementing such framework and techniques.

The framework and techniques, as described herein, may be evaluated using simulations with real topologies and idealized loss/latency models. The framework and techniques, as described herein, may be evaluated by probing in a real production cloud network. The framework and techniques, as described herein, may produce more accurate metric estimates for probe budgets that are similar to those used in conventional frameworks and techniques, such as probing all paths uniformly at random. Moreover, even with low probe budgets, the estimation error from the framework and techniques, as described herein, may remain small, making the framework and techniques usable for many telemetry tasks.

The framework and techniques, as described herein, include models to allocate probes and/or sampling in a way that minimizes the error of the performance metrics for a given budget. In addition, the framework and techniques, as described herein, include a near optimal implementation that may allow for deployment in large scale networks. Additionally, the framework and techniques, as described herein, may produce accurate estimates for a large range of probing budgets, including reduced probing budgets. In addition, the framework and techniques, as described herein, may produce an optimal allocation of probes without having observed prior traffic on the network.

In general, one aspect of the subject matter described in this specification includes a process of determining an allocation of probes to monitor a network. A sample covariance matrix for the network may be determined. An error metric may be optimized, using one or more processors, based on the sample covariance matrix and a fixed probe budget value. The error metric may be associated with an error in estimating path latencies associated with the network. The allocation of probes may be determined, using the one or more processors, based on the optimized error metric. The allocation of probes may be associated with at least one feature vector of edge indicators for the network. The optimization of the error metric may include solving a semi-definite program using the fixed probe budget value. The optimization of the error metric may include using an approximation algorithm based on a Frank-Wolfe algorithm. The error metric may be associated with a maximum error in estimating the path latencies associated with the network. The error metric may be associated with an average error in estimating the path latencies associated with the network. The allocation of probes may be less than or equal to the probe budget value.

Another aspect of the subject matter includes a system for determining network failures that includes one or more memories for storing key network failures and one or more processors configured to perform various steps. A sample covariance matrix for the network may be determined. An error metric may be optimized based on the sample covariance matrix and a fixed probe budget value. The error metric may be associated with an error in estimating path latencies associated with the network. The allocation of probes may be determined based on the optimized error metric. The allocation of probes may be stored in the one or more memories. The allocation of probes may be associated with at least one feature vector of edge indicators for the network. The optimization of the error metric may include solving a semi-definite program using the fixed probe budget value. The optimization of the error metric may include using an approximation algorithm based on a Frank-Wolfe algorithm. The error metric may be associated with a maximum error in estimating the path latencies associated with the network. The error metric may be associated with an average error in estimating the path latencies associated with the network. The allocation of probes may be less than or equal to the probe budget value.

Yet another aspect of the subject matter includes a non-transitory computer-readable medium storing instructions, that when executed by one or more processors, cause the one or more processors to perform various steps. A sample covariance matrix for the network may be determined. An error metric may be optimized based on the sample covariance matrix and a fixed probe budget value. The error metric may be associated with an error in estimating path latencies associated with the network. The allocation of probes may be determined based on the optimized error metric. The allocation of probes may be associated with at least one feature vector of edge indicators for the network. The optimization of the error metric may include using an approximation algorithm based on a Frank-Wolfe algorithm. The error metric may be associated with a maximum error in estimating the path latencies associated with the network. The error metric may be associated with an average error in estimating the path latencies associated with the network.

Yet another aspect of the subject matter described in this specification includes a process of determining a sampling rate for monitoring a network. A sample covariance matrix for the network may be determined. An error metric may be optimized, using one or more processors, based on the sample covariance matrix and a fixed sampling budget value. The error metric may be associated with an error in estimating path latencies associated with the network. The sampling rate may be determined, using the one or more processors, based on the optimized error metric. The optimization of the error metric may include using an approximation algorithm based on a Frank-Wolfe algorithm.

DETAILED DESCRIPTION

Figure 1:
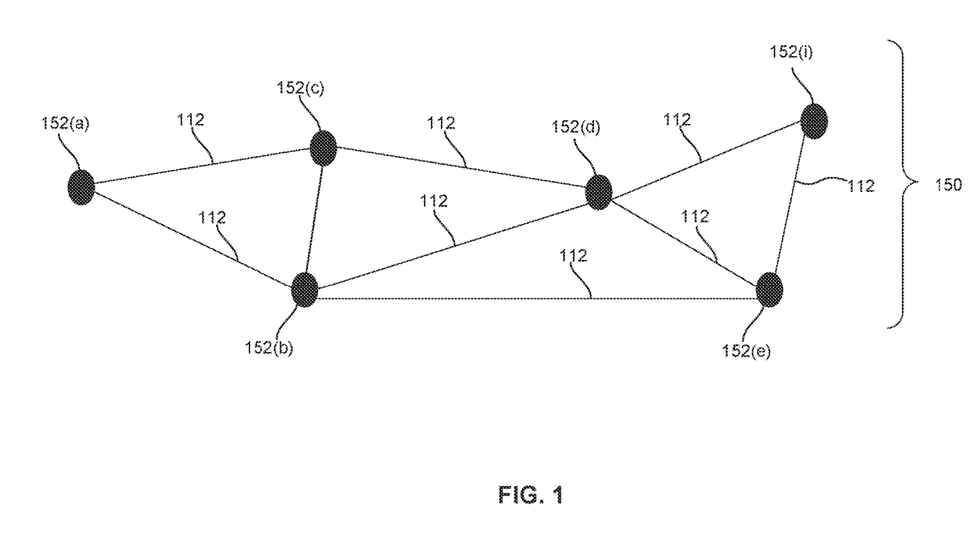
FIG. 1 depicts an example of a topology of a network.

FIG. 1 depicts an example network topology 150, which may include nodes 152(*a*), 152(*b*), 152(*c*), 152(*d*), 152(*e*), and 152(*f*), generally referred to as nodes 152. Each of the nodes 152 may be a device, such as an electronic device or a router. The logical topology 150 may define how the nodes 152 communicate across the network 150 by showing the logical communication links 112 that are available for communication between the nodes 152. Logical communication links 112 may form the connection between these nodes within the network topology 150. A path may exist between nodes. The path may be viewed as a collection of links, 112, such as hops between routers, or more abstractly as a feature vector with path characteristics. An allocation vector may correspond to a sampling and/or probing frequency for each path in the network topology. For example, the allocation vector may be used to determine the allocation of probes in the network. A network probe may be software, a general purpose device, or a special purpose device inserted into a network for the purposes of monitoring or collecting data about network activity. This may be used to monitor a network associated with network topology 150.

In some examples, inferring an allocation of probes in the network can be abstracted. An unknown function $f^*:X \rightarrow R$ that maps d-dimensional features $x \in X$ to real values $y \in R$, where $X \subseteq R^d$ is a set of all possible d dimensional feature vectors may be estimated. In the networking domain, one example of $f^*$ may be the latency of a path in a network with d edges. In this case, x may be a vector of edge indicators in a path, and $y=f^*(x)$ may be the expected latency of that path, and $X \subseteq \{0, 1\}^d$ may be the set of all paths. Here the edge indicators may be defined as having a value of 1 if an edge exists between nodes in a network, and 0 if an edge does not exist between nodes in a network. The function $f^*$ may be estimated from a dataset $D=\{(x_i,y_i):x_i \in X, y_i \in R, i \in [n]\}$ of n training examples, where $x_i$ is the i-th feature vector and $y_i$ is a noisy realization of $f^*(x_i)$. No assumption that $x_i$, $x_j$ when i, j may be made. As may be common in machine learning, a dataset may contain multiple identical feature vectors with different noisy responses. A best possible approximation to $f^*$ with guarantees, such as worst case and average case guarantees, may be learned.

For the worst case guarantee, $f^*$ may be approximated well for all $x \in X$. In this case, a natural metric to optimize may be the maximum error, $$L_{max}(f) = \max_{x \in X} (f(x) - f^*(x))^2. \tag{1}$$

In some examples, the above squared term may be replaced with an absolute value. In our earlier example, X may be the set of all paths and $L_{max}(f)$ may be the maximum squared error in estimating path latencies.

For the average case guarantee, P may be a distribution over feature vectors in X. Then the average error over $x \sim P$, $$L_{avg}(f) = E_{x \sim P}[(f(x) - f^*(x))^2] \tag{2}$$

may be optimized. The above squared term assigns higher importance to higher errors. In the earlier example, P may be a distribution over paths X and $L_{avg}(f)$ may be the mean squared error in estimating path latencies, weighted by P.

Stating the problem more formally, given a fixed error metric, such as $L_{max}$, and a fixed budget of n measurements, an allocation $(x_i)^n_{i=1}$ may be designed that allows for a good approximation to $f^*$, as measured by $L_{max}$. That is, $\hat{f}$ may be learned from the dataset D such that $L_{max}(\hat{f}) \leq c$ with a high probability, for an appropriately chosen c. Effectively, the allocation determines which feature vectors should be in D, the set of observations/measurements, before fitting $\hat{f}$. While $\hat{f}$ may be estimated from measurements $(y_i)^n_{i=1}$ in D, these measurements may not be available at the time of deciding of what to measure. However, the features $(x_i)^n_{i=1}$ may be available.

To optimize errors (1) and (2), a class of functions $f : R^d \to R$ may be chosen where $|f(x) - f^*(x)|$ is bounded by an expression that only depends on features $(x_i)^n_{i=1}$, and not on measurements $(y_i)^n_{i=1}$. These may be linear models, which may be optimized. Generality and feasibility of solutions may be ensured in a large and global modern network. Approximate solutions that may also be practical for scaling and generalizations to a non-linear class of functions may also be made.

Linear models for the optimization of errors (1) and (2) may be used. In particular, given a feature vector $x \in R^d$, the true value of the unknown function evaluated at $x, f^*(x)$, is linear in x, and may be assumed and defined by $f^*(x) = x^T \theta^*$, where $\theta^* \in R^d$ is a vector of unknown model parameters. It may also be assumed that access to noisy observations y, which may be obtained by adding Gaussian noise to the true value $f^*(x)$ as $$y = f^*(x) + \epsilon = x^T \theta^* + \epsilon, \tag{3}$$

for $\epsilon \sim N(0, \sigma^2)$ and some known $\sigma > 0$. It may be assumed that all examples in dataset D are generated this way, that is, $y_i = x_i^T \theta^* + \epsilon_i$ for all $i \in [n]$, where $\epsilon_i \sim N(0, \sigma^2)$ are drawn independently of each other.

Least squares regression estimates model parameters $\theta$ by minimizing the sum of squares $\hat{\theta} = \arg\min_\theta \Sigma^n_{i=1}(y_i - x_i^T \theta)^2$. Under the assumption that $G = \Sigma^n_{i=1} x_i x_i^T$ is invertible, this problem may have the unique closed-form solution $\hat{\theta} = G^{-1} \Sigma^n_{i=1} y_i x_i$. The matrix G may be known as a sample covariance matrix. The parameter $\hat{\theta}$ may follow a multivariate normal distribution with mean $E[\hat{\theta}] = \theta^*$ and covariance $Cov(\hat{\theta}) = \sigma^2 G^{-1}$, for any $(x_i)^n_{i=1}$.

In some examples, using the feature vector x, the true value $f^*(x) = x^T \theta^*$ may be estimated by $\hat{f}(x) = x^T \hat{\theta}$. Using the knowledge that $\hat{\theta} \sim N(\theta^*, \sigma^2 G^{-1})$, we may derive that $\hat{f}(x)$ is also normally distributed:

$$\hat{f}(x) \sim N(f^*(x), \sigma^2 x^T G^{-1} x). \tag{4}$$

From tail inequalities for Gaussian random variables [10], it follows that:

$$(\hat{f}(x) - f^*(x))^2 \leq 2 \log(1/\delta) \sigma^2 x^T G^{-1} x \tag{5}$$

holds with probability at least $1 - \delta$. Therefore, the problem of designing a good approximation $\hat{f}$ to $f^*$, with a high probability bound on $(\hat{f}(x) - f^*(x))^2$, may be reduced to designing a good sample covariance matrix G, with an upper bound on $x^T G^{-1} x$. Note that the expression $x^T G^{-1} x$ may not depend on the measurements $y_i$, but it may depend on the features $x_i$. In statistics, this class of problems is referred to as the optimal experimental design.

The linear models may be useful for modeling a canonical networking problem of predicting latency. In particular, because the latency of a path may be the sum of latencies on edges of that path, the latency may be a linear function. In some examples, $\theta^* \in R^d$ may be a vector of mean latencies of d edges, where $\theta^*(e)$ is the mean latency of edge e. In these examples, $x \in \{0, 1\}^d$ may be a vector of edge indicators in a path. As such, in these examples, $f^*(x) = x^T \theta^*$ may represent the mean latency of path x.

Figure 2:
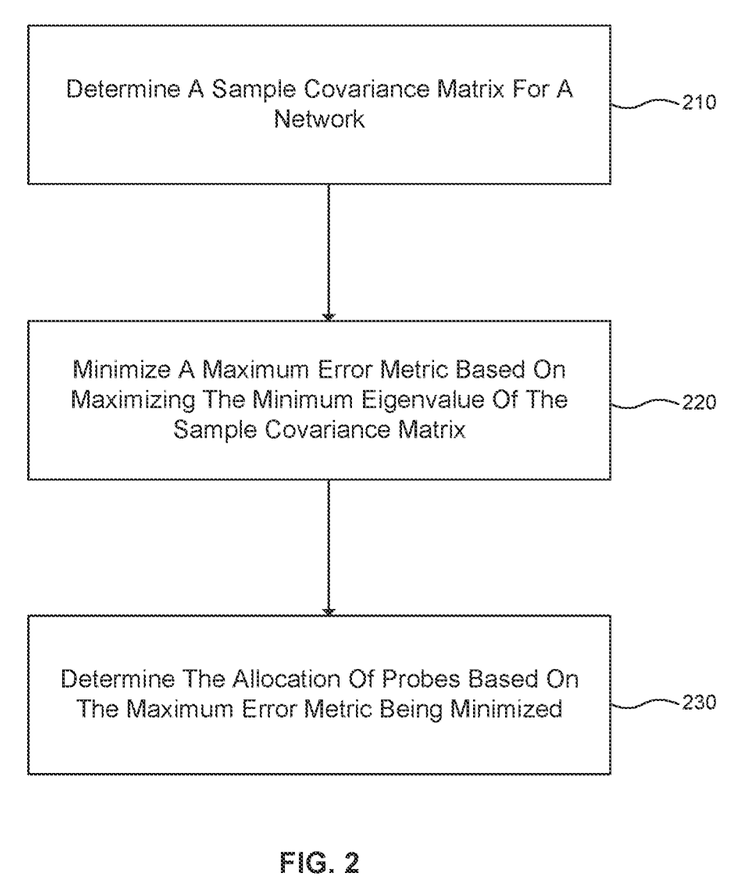
FIG. 2 is a flow diagram of an example process for determining an allocation of probes to monitor a network using an E-optimal design.

FIG. 2 is a flow diagram of example process 200 for determining an allocation of probes to monitor a network using an E-optimal design. In some examples, the process 200 may be performed in whole or in part by an electronic device, such as electronic device 500 described in connection with FIG. 5. At block 210, a sample covariance matrix, G, for the network may be determined/defined, such as what is described above.

The sample covariance matrix, G, may be optimized. For any symmetric matrix $M \in R^{d \times d}$, $\lambda_i(M)$ may denote the i-th largest eigenvalue of M. Additionally, $\lambda_{max}(M) = \lambda_1(M)$ and $\lambda_{min}(M) = \lambda_d(M)$. The trace of M is the sum of its eigenvalues, $tr(M) = \Sigma^d_{i=1} \lambda_i(M)$. The matrix, M may be a positive semi-definite (PSD) matrix, it may be denoted by $M \succeq 0$, if $x^T M x \geq 0$ for all $x \in R^d$.

At block 220, a maximum error metric may be minimized based on maximizing the minimum eigenvalue of the sample covariance matrix G. The error metric may be associated with an error in estimating path latencies associated with the network. In some examples, computing the E-optimal design may involve the minimization of the maximum error in equation (1), above. Minimization of the maximum error in equation (1), above, may be reduced to optimizing G. Without loss of generality, X in equation (1) may be a unit sphere, $X = \{x : \|x\|_1 = 1\}$. In this case, $$L_{max}(\hat{f}) \propto \max_{x \in X} x^T G^{-1} x = \lambda_{max}(G^{-1}) = \lambda^{-1}_{min}(G).$$

The left side of this proportionality relationship may follow from the definition of $L_{max}$ in equations (1) and (5) above, where the constant factor $2 \log(1/\delta) \sigma^2$ may be omitted. The first equality may be derived from the definition of the maximum eigenvalue, and the second equality may be derived from a result in linear algebra in which the maximum eigenvalue of any PSD matrix M is the reciprocal of the minimum eigenvalue of its inverse $M^{-1}$.

Therefore, the minimization of equation (1) above may be achieved by maximizing the minimum eigenvalue of the sample covariance matrix G. This may be known as the E-optimal design and may be formulated as the following semi-definite program (SDP).

$$\max \tau$$

$$s.t. \Sigma_{x \in X} \alpha_x x x^T \succeq \tau I_d,$$

$$\Sigma_{x \in X} \alpha_x \leq n, \forall x \in X : \alpha_x \geq 0, \tag{6}$$

This SDP above has two types of variables. The variable τ may be the minimum eigenvalue of the sample covariance matrix. It may also be the objective that is maximized. The variable $\alpha_x$ may be used to encode the expected number of times that x should appear in dataset D.

At block 230, an allocation of probes may be determined based on the maximum error metric being minimized. In particular, $\alpha_x$ may be determined and this may be directly related to the allocation of probes. The allocation of probes may be associated with at least one feature vector of edge indicators, x, for the network.

In the equation (6), above, $\alpha_x$ may not be integers. For example, when $\alpha_x=1.5$, it may not be obvious how to collect a dataset D where the feature vector x appears 1.5 times. To address this issue, a randomization may be used and a dataset D may be generated where any feature vector x appears $\alpha_x$ times in expectation. Such a dataset may be generated in many ways. In some examples, $x_i=x$ may be set with probability $\alpha_x/n$, independently for all $i \in [n]$. Note that $\alpha_x/n$ may be a valid probability, because $\alpha_x \geq 0$ and $\Sigma_{x \in X} \alpha_x = n$ whenever $\alpha=(\alpha_1, \ldots, \alpha_{|X|})$ solves the equation (6), above.

Figure 3:
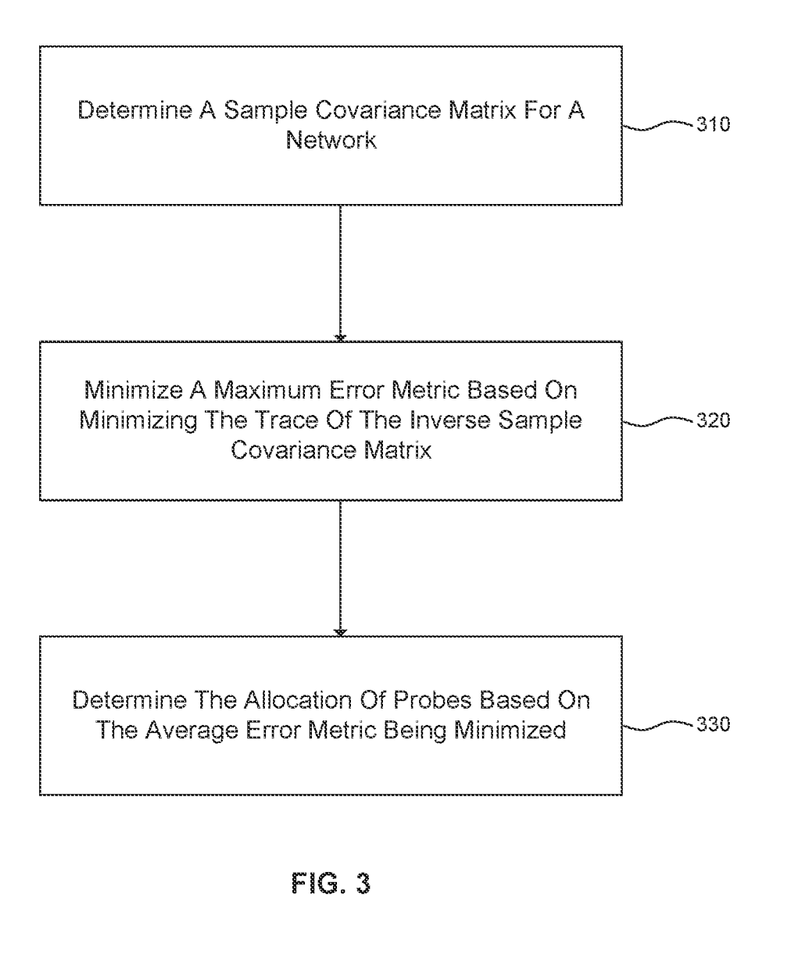
FIG. 3 is a flow diagram of an example process for determining an allocation of probes to monitor a network using an A-optimal design.

FIG. 3 is a flow diagram of example process 300 for determining an allocation of probes to monitor a network using an A-optimal design. In some examples, the process 300 may be performed in whole or in part by an electronic device, such as electronic device 500 described in connection with FIG. 5. At block 310, a sample covariance matrix, G, for the network may be determined/defined, such as what is described above.

At block 320, an average error metric may be minimized based on minimizing the trace of the inverse sample covariance matrix $G^{-1}$. The error metric may be associated with an error in estimating path latencies associated with the network. In some examples, computing the A-optimal design may involve the minimization of the average error in equation (2), above. Minimization of the average error in equation (2), above, may involve optimizing the sample covariance matrix G as follows. Without loss of generality, X in equation (2) may be a unit sphere, $X=\{x:\|x\|_2=1\}$. In addition, P may be a uniform distribution over the unit sphere. Then, $U\Lambda U^T=G^{-1}$ may represent the eigen decomposition of $G^{-1}$, which may be PSD by definition. Then $$L_{avg}(f^\wedge) \propto E_{X \sim P}[x^\top G^{-1} x] = E_{X \sim P}[x^\top U\Lambda U^\top x]$$
$$= E_{X \sim P}[x^\top \Lambda x] \propto \sum_{k=1}^{d} \lambda_i(G^{-1}) = tr(G)^{-1}.$$

The initial portion of the above equations may be realized based on the definition of $L_{avg}$ in equations (2) and (5), above, where the constant factor $2 \log(1/\delta)\sigma^2$ may be omitted. The second equality of the above equations may be realized because U performs a rotation and X is a unit sphere. Additionally, the final portion of the above equations are realized because X is a unit sphere.

Therefore, minimization of equation (2), above, may involve minimizing the sum of the eigenvalues of $G^{-1}$, which is equal to the trace of $G^{-1}$. This may be known as the A-optimal design and may be formulated as the following semi-definite program (SDP).

$$\max \Sigma_{i=1}^{d} \tau_i$$

$$s.t. \ \forall i \in [d]: [\Sigma_{x \in X} \alpha_x x x^T, e_i; e_i^T, \tau_i] \succeq 0$$

$$\Sigma_{x \in X} \alpha_x \leq n, \forall x \in X: \alpha_x \geq 0, \qquad (7)$$

Here, $e_i$ is the i-th element of the standard d-dimensional Euclidean basis. This SDP may have two types of variables. The variable $\tau_i$ may represent the i-th eigenvalue of the inverse sample covariance matrix. The sum of these variables $\Sigma_{i=1}^{d} \tau_i$ may be equal to tr $(G)^{-1}$ and to the objective function that is minimized. The variable $\alpha_x$ may be the expected number of times that x should appear in dataset D, similar to what is described above. Upon solving this SDP, the dataset D may be obtained as described above.

At block 330, an allocation of probes may be determined based on the average error metric being minimized. In particular, $\alpha_x$ may be determined and this may be directly related to the allocation of probes. The allocation of probes may be associated with at least one feature vector of edge indicators, x, for the network.

Each of the optimal designs from equations (6) and (7), above, may output an allocation $\alpha=(\alpha_1, \ldots, \alpha_{|X|})$ subject to a global constraint $\Sigma_{x \in X} \alpha_x \leq n$, which means that the total number of measurements is at most n. In some examples, in practice, local budget constraints may be more common. The budget, sometimes referred to as a probe budget, may be defined as a maximum number of network probes. In some examples, it may be useful to enforce a policy that most paths do not start in a single source node, because such an allocation may not be implemented due to resource availability constraints. Such constraints may be enforced as follows. Let src(x) be the source of path x and S={src(x): $x \in X$} be the set of all sources. Then $$\forall_s \in S: \Sigma_{x \in X} 1\{src(x)=s\}\alpha_x \leq b$$

may be a set of linear constraints in a that limit the number of measurements from any source s to at most b. Because the constraints may be linear in $\alpha$, they may be easily incorporated into equations (6) and (7), above, without changing the hardness of these problems, which each remain an SDP. The framework and techniques, as described herein, for solving equations (6) and (7), above, may be generalized.

The optimal designs, described above, may be theoretically sound. In some examples, it may not be computationally efficient to solve the optimal designs exactly as SDPs. For these examples, the solutions may be approximated using additional techniques, such as linear programming and gradient descent. The additional techniques may allow for the implementation of approximation algorithms, which determine approximate solutions to the optimal designs, that scale gracefully and that may be used in a large and global production network. In some examples, as described herein, the optimal designs may be extended to generalized linear models and/or general non-linear models.

In some examples, exact solutions to the SDPs defined by equations (6) and (7), above, may be computationally costly. In some examples, these SDPs may be solved using interior-points methods, which, in some cases, may be slow and/or difficult to scale. Therefore, in these examples, an approximate solution to the SDPs defined by equations (6) and (7), above, may be more computationally efficient and easier to scale. For example, solving equation (6), above may be based on enforcing $A \in R^{d \times d}$ to be PSD, which may equate to satisfying infinitely many constraints $x^T Ax > 0$, for any $x \in R^d$, which may be linear in the parameterization of A. Continuing with this example, an approximate cutting plane algorithm may be designed, which may generate x and solve a sequence of linear programs (LPs). Such an approach may reduce run time, as compared to interior-points methods. For example, the run time may be reduced by two orders of magnitude when the number of added constraints is small. In some examples, however, there may be a drop in the quality of solutions. In these examples, the quality of the solutions may increase with additional linear program constraints, but the computational cost may also be increased as a result. In these examples, adding additional LP constraints may make this approach difficult to scale because the added LP constraints may not be sparse, and such lack of sparsity may decrease the efficiency of such an approach. Such an approach may be viewed as solving the equations (6) and (7), above, exactly on an outer polytope of the feasible sets. Due to the drop in the solution quality, in some examples, as described above, an opposite approach may be considered. For example, in this opposite approach, the feasible set may be maintained and the SDPs may be solved approximately using algorithms based on the Frank-Wolfe algorithm. This may result in near optimal solutions to the SDPs, and these solutions may be achieved with an orders-of-magnitude reduction in run time.

Figure 4:
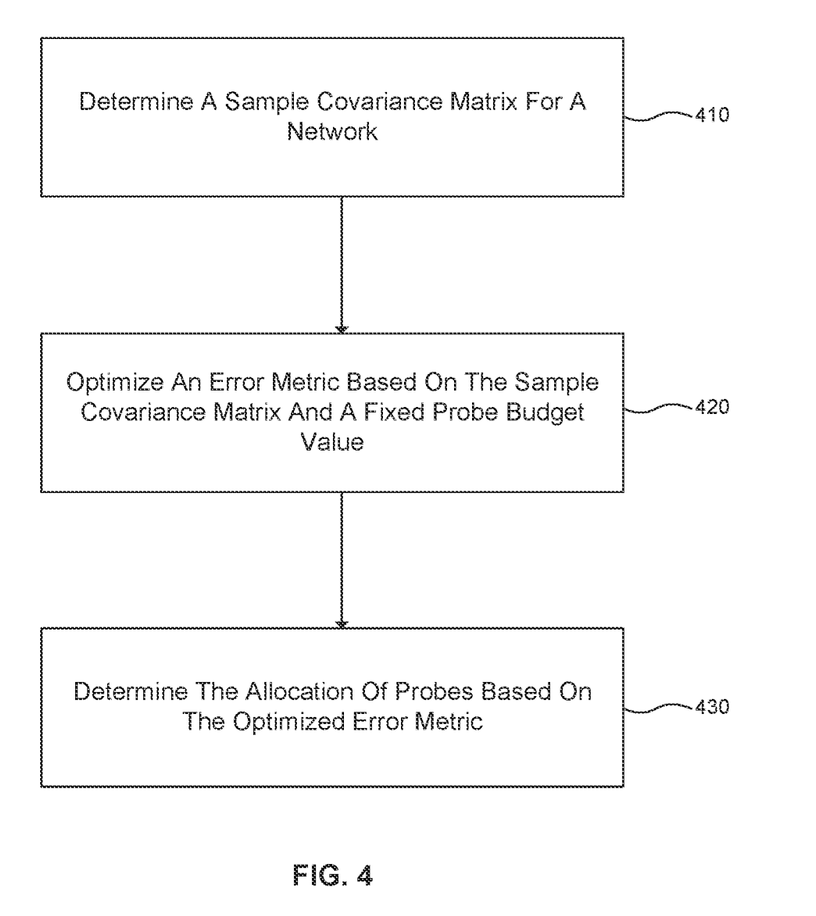
FIG. 4 is a flow diagram of an example process for determining an allocation of probes to monitor a network using an approximation algorithm.

FIG. 4 is a flow diagram of example process 400 for determining an allocation of probes to monitor a network using an approximation algorithm. In some examples, process 400 may be used for determining a sampling rate to monitor the network using the approximation algorithm. The approximation algorithm may be based on the Frank-Wolfe algorithm. In some examples, the process 400 may be performed in whole or in part by an electronic device, such as electronic device 500 described in connection with FIG. 5. At block 410, a sample covariance matrix for the network may be determined/defined. For example, $G_\alpha = \Sigma_{x \in X} \alpha_x xx^T$ may be defined as the sample covariance matrix for allocation $\alpha \in \Delta(X)$, where $\Delta(X)$ is a simplex with vertices X.

The Frank-Wolfe algorithm is a popular algorithm for constrained optimization problems of the form $$\min_{\alpha \in A} f(\alpha)$$

where $f$ is the optimized function, $A \in R^d$ is a convex feasible region defined by linear constraints, and $\alpha \in A$ is the optimized parameter vector. The algorithm may be solved iteratively by solving a sequence of linear programs (LPs)

$$g(\alpha) = \arg\min_{\overline{a} \in A} \overline{a}^T \Delta f(\alpha) \qquad (9)$$

In particular, if $\alpha^{(i)} \in A$ is the Frank-Wolfe solution in iteration i, the next solution $\alpha^{(i+1)}$ may be obtained as follows. For example, $\overline{a} = g(\alpha^{(i)})$ may be computed, which may be an LP. Then, $\alpha^{(i+1)}$ may be a solution to the line search problem $$\alpha^{(i+1)} = \arg\min_{c \in [0,1]} f(c\alpha^{(i)} + (1-c)\overline{a}).$$

The Frank-Wolfe algorithm converges when $f$ and A are convex. An advantage of the Frank-Wolfe algorithm over gradient descent with a projection to A may be that a projection is not needed in the Frank-Wolfe algorithm. Instead, the LPs in (9), above, may be solved iteratively where the feasibility may be enforced.

The Frank-Wolfe algorithm may strike an elegant balance. On one hand, the LPs in (9), above, may represent the linear constraints in equations (6) and (7), above. On the other hand, the hard problem of eigenvalue optimization may be solved by gradient descent. This approach may be applied to A- and E-optimal designs.

At block 420, an error metric based on the sample covariance matrix and a fixed probe budget value may be optimized. In some examples, an error metric based on the sample covariance matrix and a fixed sampling budget value may be optimized. For example, this may be performed using an approximation algorithm based on the Frank-Wolfe algorithm. The error metric may be associated with an error in estimating path latencies associated with the network. In particular, the error metrics associated with either the E-optimal design or the A-optimal design, described above, may be optimized. As described above, the optimization of an error metric may include solving a semi-definite program using a predetermined fixed probe budget value.

As one example, for the E-optimal design approximation algorithm based on the Frank-Wolfe algorithm, $G_\alpha = \Sigma_{x \in X} \alpha_x xx^T$ may be the sample covariance matrix for allocation $\alpha \in \Delta(X)$, where $\Delta(X)$ is a simplex with vertices X. In some examples, for the E-optimal design, the error metric to be optimized may be associated with a maximum error in estimating the path latencies associated with the network. To optimize this error metric, the E-optimal design, as described above, may maximize the minimum eigenvalue of the sample covariance matrix:

$$\max_{\alpha \in \Delta(X)} \lambda_{min}(G_\alpha) \qquad (10)$$

From the definitions of $\lambda_{min}$ and $G_\alpha$, $$\lambda_{min}(G_\alpha) = \min_{v \in Rd: \|v\|2=1} v^T (\Sigma_{x \in X} \alpha_x xx^T) v$$

$$= \min_{v \in Rd: \|v\|2=1} \Sigma_{x \in X} \|v^T x\|_2^2 \alpha_x.$$

Since $\|v^T x\|_2^2 \alpha_x$ is linear in $\alpha$ for any v, $\lambda_{min}(G_\alpha)$ is concave in $\alpha$. Thus $-\lambda_{min}(G_\alpha)$ is convex in $\alpha$ and the equation (10), above, may be solved by an algorithm based on the Frank-Wolfe algorithm. In particular, in this formulation, $A = \Delta(X)$, $f(\alpha) = -\lambda_{min}(G_\alpha)$, and $\Delta f(\alpha)$ may be derived as follows. If $x_i$ is the i-th element in X, and since $\lambda_{min}(G_\alpha)$ is linear in $\alpha$, $$\Delta f(\alpha) = -\Delta \lambda_{min}(G_\alpha) = -(\|v^T_{min} x_1\|_2^2, \ldots, \|v^T_{min} x_{|X|}\|_2^2)$$

where $v_{min}$ is the eigenvector associated with $\lambda_{min}(G_\alpha)$. The time to compute the gradient $\Delta f(\alpha)$ may be linear in |X|, which is the number of partial derivatives. Because the time to compute this gradient may be the most computationally-demanding part of this approximation algorithm based on the Frank-Wolfe algorithm, its run time may be close to linear in |X| and the number of iterations. Therefore, the approach may be scalable to large problems.

As another example, for the A-optimal design approximation algorithm based on the Frank-Wolfe algorithm, $G_\alpha = \Sigma_{x \in X} \alpha_x xx^T$ may be the sample covariance matrix for allocation $\alpha \in \Delta(X)$, where $\Delta(X)$ is a simplex with vertices X. In some examples, for the A-optimal design, the error metric to be optimized may be associated with an average error in estimating the path latencies associated with the network. To optimize this error metric, the A-optimal design, as described above, minimizes the trace of the inverse sample covariance matrix:

$$\min_{\alpha \in \Delta(X)} tr(G_\alpha^{-1}) \qquad (11)$$

Because equation (11), above, may be convex in $\alpha$, equation (11) may be solved by an algorithm based on the Frank Wolfe algorithm. In particular, in this formulation, $A = \Delta(X)$, $f(\alpha) = tr(G_\alpha^{-1})$, and $\nabla f(\alpha)$ may be derived as follows. For any invertible matrix $M \in R^{d \times d}$ $$\partial tr(M^{-1}) = tr(\partial M^{-1}) = -tr(M^{-1}(\partial M)M^{-1}).$$

Applying this identity to $M = G_\alpha$ and noting that the partial derivative of $G_\alpha$ with respect to $\alpha_x$ may be $\partial G_\alpha / \partial \alpha_x = xx^T m$, this yields $$\nabla f(\alpha) = -(tr(G_\alpha^{-1} x_1 x_1^T G_\alpha^{-1}), \quad . \quad . \quad . \quad , tr(G_\alpha^{-1} x_{|X|} x_{|X|}^T G_\alpha^{-1})),$$

where $x_i$ is the i-th element in X. Again, because the time to compute this gradient may be the most computationally-demanding part of this approximation algorithm based on the Frank-Wolfe algorithm, its run time may be close to linear in |X| and the number of iterations. Therefore, the approach may be scalable to large problems.

At block 430, an allocation of probes may be determined based on the optimized error metric, such as from the solutions of equations (10) or (11). In particular, $\alpha_x$ may be determined, for example, from the solutions of equations (10) or (11) above, and this may be directly related to the allocation of probes. The allocation of probes may be associated with at least one feature vector of edge indicators, x, for the network. The allocation of probes may be less than or equal to a predetermined fixed probe budget value. In some examples, rather than an allocation of probes, a sampling rate may be determined using the same technique. The sampling rate may similarly be associated with at least one feature vector of edge indicators for the network.

In some examples, the allocation of probes determined in the last block of process 200, 300, and/or 400, described above, may be compared to a threshold number of probes to ensure that the allocation is a valid allocation. For example, the allocation of probes may be compared to a threshold that may be equal to a total budget of n probes, where n may be a positive integer number. For example, the allocation of probes may be compared to a threshold that may be equal to a minimum number of probes to be used in the network. In some examples, the allocation of probes determined in the last block of process 200, 300, and/or 400, described above, may be displayed together with the associated network topology on a display of an electronic device, such as electronic device 500 described in connection with FIG. 5, on which the process 200, 300, and/or 400 is implemented. In some examples, the allocation of probes and their placements in the network determined in the last block of process 200, 300, and/or 400, described above, may be stored in one or more memories or storage devices associated with an electronic device, such as electronic device 500 described in connection with FIG. 5. The framework and techniques, as described above, may improve the computational efficiency and speed with which any computing system and/or network resources, implementing such a framework and techniques, may solve for an optimal probe allocation vector when compared to conventional frameworks and techniques. As such, when compared to conventional frameworks and techniques, the use of the framework and techniques, as described herein, may reduce power consumption and increase the available bandwidth of any computing system and/or network resources implementing such framework and techniques.

In some examples, process 200, 300, and/or 400, described above, may be implemented by special purpose logic circuitry, such as a field programmable gate array (FPGA), an application specific integrated circuit (ASIC), a general purpose processor, and/or one or more components of a general purpose electronic device, such as electronic device 500, described in connection with FIG. 5, below.

Generalized linear models (GLMs) may extend linear models to non-linear functions in a way that may inherit the beneficial statistical and computational properties of the linear models. Specifically, in a GLM, the measurement y∈R at feature vector x∈X may have an exponential-family distribution with mean $f^*(x)=\mu(x^T\theta^*)$, where $\mu$ is the mean function and $\theta^*\in R^d$ are model parameters. For any mean function $\mu$, the matrix of second derivatives of the GLM loss at solution $\theta^*$, also called the Hessian, may be $$H=\Sigma^n_{i=1}\mu^{\cdot}(x_i^T\theta^*)x_ix_i^T \quad (12)$$

where $\mu^{\cdot}$ may be the derivative of the mean function $\mu$. This Hessian may play the same role as the sample covariance matrix G in equation (5), above. Therefore, up to the factor of $\mu^{\cdot}(x_i^T\theta^*)$, the optimal designs, described above, may be used to minimize the maximum and average errors in GLMs.

In some examples, Poisson regression, an instance of GLMs, may be used to estimate packet losses. In particular, $f^*(x)=\exp[x^T\theta^*]$ may be the probability that the packet is not dropped on path x∈X and $\theta^*\in R^d$ may be a vector of log-probabilities that packets are not dropped on all path edges.

The framework and techniques, as described herein, may be extended to non-linear models. A non-linear mapping of features into a lower r-dimensional space may be learned. This mapping may be learned in order to produce a linear regression problem in the new space. In particular, g: $R^d \rightarrow R^r$ such that $f^*(x) \approx g(x)^T\theta^*$ may be learned.

The function g may be learned as follows. If m is the number of tasks and $D_j$ is the dataset corresponding to task j∈[m], in networking, the task j may be viewed as an inference problem on day j, which may be accompanied by its training set $D_j$. This function g may be learned by solving $$\min_g \min_{\theta_1,\ldots,\theta_m} \Sigma^m_{j=1}\Sigma_{(x,y)\in D_j}(g(x)^T\theta_j-y)^2 \quad (13)$$

where $\theta_j\in R^r$ may be optimized model parameters for task j.

A key structure in the above loss function may be that function g is shared among the tasks. Therefore, the minimization of g may lead to learning a common embedding g, which may essentially be a compression of features x, that may be useful for solving all tasks using linear regression. The above optimization problem may be solved using a multi-headed neural network, where g is the body of the network and head j outputs $g(x)^T\theta_j$, which may be the predicted value at feature vector x for task j.

The framework and techniques described herein may use a statistical approach to monitoring large scale network infrastructure. The statistical approach may have provable guarantees on the quality of estimates under the constraint of a limited probing budget. Such an approach may be used in any production network to measure most network performance metrics. For example, such an approach may be used when the metric estimation problem may be expressed as a regression problem. The operational use of such framework and techniques, as described herein, does not face the obstacle of computation time of optimal strategies as faced by conventional techniques. The use of such framework and techniques makes no assumption about network switch/router hardware capabilities. In some examples, such framework and techniques may operate in a target budget mode and/or a target measure accuracy mode. As can be shown through simulation and experimentation on real network topologies such as those supporting global cloud services, such framework and techniques may estimate latency and loss with low error, even in the case of low probing budgets. The framework and techniques, as described herein, may outperform conventional techniques, such as a uniform probing strategy, generally used in production networks. The framework and techniques used to determine an allocation of probes to monitor a network, as described herein, may produce more accurate network monitoring than conventional techniques, may be more computationally feasible, may be more efficient than conventional techniques, may use fewer probes than conventional techniques, and may be able to scale better than conventional techniques. In addition, such framework and techniques may be well suited for optimizing probing for network link loss and latency estimation.

Extending the framework and techniques, as described herein, may be extended to other telemetry tasks, such as estimating available bandwidth, flow size distribution, or top flows may be straightforward. For example, the extension to other telemetry tasks may be possible when the estimation problem may be formulated as regression. In addition, in some examples, as described above, it may be possible to learn of a non-linear embedding that may transform potentially any estimation problem into regression, with appropriate features. In these examples, it may then be possible to apply the A- and E-optimal designs on the new learned features, as described above. Additionally, the framework and techniques, as described herein, may be extended to optimize for sampling budgets instead of or in addition to optimizing for probing budgets. In some examples, optimizing for sampling budgets may be possible as long as the packet count is known for each end-to-end path, in which case the optimization may be performed with an additional constraint, such as not sampling traffic on a path or link that does not carry any traffic.

The framework and techniques, as presented herein, may be used to offer an operational probing and/or sampling service that may accept the following inputs: a topology, a path level, such as OD pairs, a traffic matrix with a packet count, a telemetry function, such as median latency, flow size distribution, and link failures, and either a probing and/or sampling budget or a target statistical accuracy for a metric to compute. The service may output an optimal sampling and/or probing strategy to perform in hosts. In some examples, the optimal strategy may be related to optimal probe/monitor placement in which determinations are made as to where to monitor the network and at what sampling rate in order to perform accurate measurement of network metrics with limited impact on network resources. Controlling the accuracy of the performance estimation may be used to monitor at scale and at low time granularity in hyper-scale networks.

Figure 5:
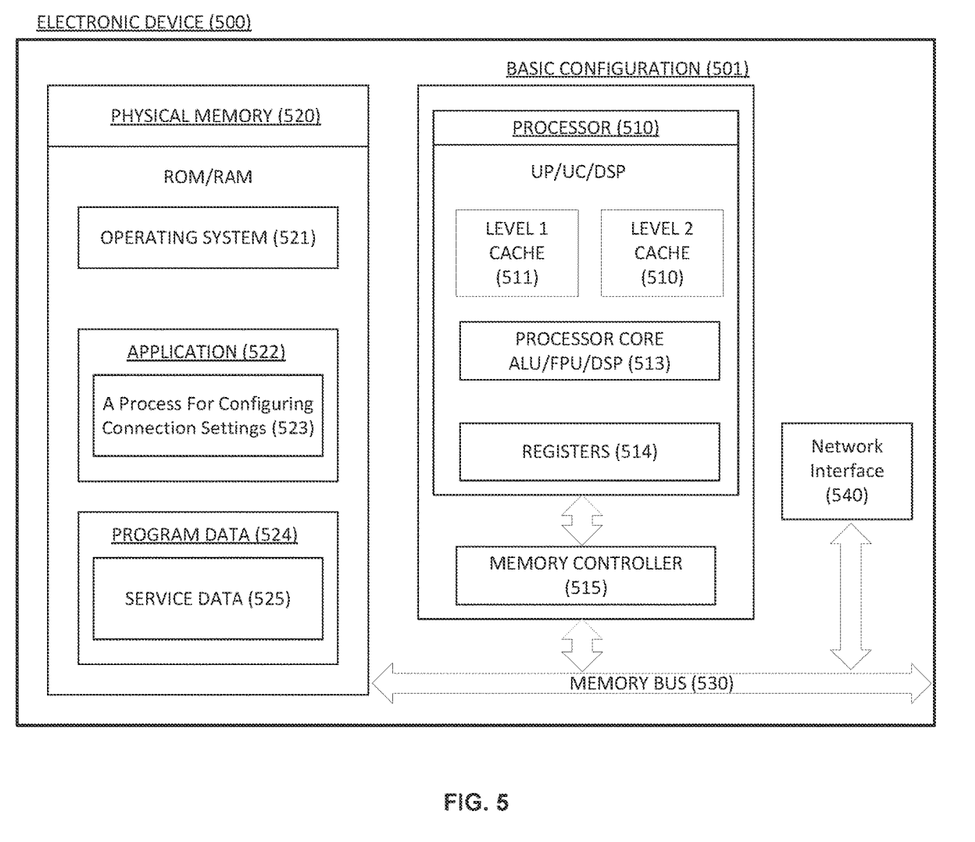
FIG. 5 depicts a block diagram of an example electronic device in accordance with aspects of the disclosure.

FIG. 5 depicts a block diagram of an example electronic device 500. Electronic device 500 may be any computing device. The electronic device 500 may include one or more processor 510, system memory 520, a bus 530, the networking interface(s) 540, and other components (not shown), such as storage(s), output device interface(s), input device interface(s). A bus 530 may be used for communicating between the processor 510, the system memory 520, the networking interface(s) 540, and other components. Any or all components of electronic device 500 may be used in conjunction with the subject of the present disclosure.

Depending on the desired configuration, the processor 510 may be of any type including but not limited to a tensor processing unit (TPU), a microprocessor, a microcontroller, a digital signal processor (DSP), or any combination thereof. The processor 510 may include one more level of caching, such as a level one cache 511 and a level two cache 512, a processor core 513, and registers 514. The processor core 513 may include one or more arithmetic logic unit (ALU), one or more floating point unit (FPU), one or more DSP core, or any combination thereof. A memory controller 515 may also be used with the processor 510, or in some implementations the memory controller 515 can be an internal part of the processor 510.

Depending on the desired configuration, the physical memory 520 may be of any type including but not limited to volatile memory, such as RAM, non-volatile memory, such as ROM, flash memory, etc., multiple of these memories, or any combination thereof. The physical memory 520 may include an operating system 521, one or more applications 522, and program data 524, which may include service data 525. Non-transitory computer-readable medium program data 524 may include storing instructions that, when executed by the one or more processing devices, implement a process for determining an allocation of probes to monitor a network 523. In some examples, the one or more applications 522 may be arranged to operate with program data 524 and service data 525 on an operating system 521. The framework and techniques, as described herein, may improve the functioning of a computing and/or electronic device, such as electronic device 500. In addition, the framework and techniques, such as process 523 as described herein, may increase computational efficiency and speed with which any computing system and/or network resources, implementing such a framework and techniques, may solve for an optimal probe allocation vector when compared to conventional frameworks and techniques.

The electronic device 500 may have additional features or functionality, and additional interfaces to facilitate communications between the basic configuration 501 and any required devices and interfaces.

Physical memory 520 may be an example of computer storage media. Computer storage media includes, but is not limited to, RAM, ROM, EEPROM, flash memory or other memory technology, or any other medium which can be used to store the desired information and which can be accessed by electronic device 500. Any such computer storage media can be part of the device 500.

Network interface(s) 540 may couple the electronic device 500 to a network (not shown) and/or to another electronic device (not shown). In this manner, the electronic device 500 can be a part of a network of electronic devices, such as a local area network ("LAN"), a wide area network ("WAN"), an intranet, or a network of networks, such as the Internet. In some examples, the electronic device 500 may include a network connection interface for forming a network connection to a network and a local communications connection interface for forming a tethering connection with another device. The connections may be wired or wireless. The electronic device 500 may bridge the network connection and the tethering connection to connect the other device to the network via the network interface(s) 540.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, solid state memory, flash drive, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The invention claimed is:

1. A method for determining an allocation of probes to monitor a network, the method comprising:
   determining a sample covariance matrix for the network;
   optimizing, using one or more processors, an error metric based on the sample covariance matrix and a fixed probe budget value, wherein the error metric is associated with an error in estimating path latencies associated with the network and the fixed probe budget value is based on a maximum number of probes to monitor the network;
   determining, using the one or more processors, the allocation of probes based on the optimized error metric, wherein the allocation of probes is associated with at least one feature vector of edge indicators for the network; and
   comparing, using the one or more processors, the allocation of probes to at least one of a threshold associated with the fixed probe budget value or a threshold associated with a minimum number of probes to monitor the network to confirm the allocation of probes is a valid allocation.

2. The method of claim 1, wherein the optimizing the error metric comprises solving a semi-definite program using the fixed probe budget value.

3. The method of claim 1, wherein the optimizing the error metric comprises using an approximation algorithm based on a Frank-Wolfe algorithm.

4. The method of claim 3, wherein the approximation algorithm comprises determining a gradient of a function of a minimum eigenvalue of the sample covariance matrix.

5. The method of claim 3, wherein the approximation algorithm comprises determining a gradient of a function of a trace of a matrix computed using an inverse of the sample covariance matrix.

6. The method of claim 1, wherein the error metric is associated with a maximum error in estimating the path latencies associated with the network.

7. The method of claim 1, wherein the error metric is associated with an average error in estimating the path latencies associated with the network.

8. The method of claim 1, wherein the allocation of probes is less than or equal to the probe budget value, and wherein the vector of edge indicators for the network indicates whether there is an edge between nodes in the network.

9. A system for determining an allocation of probes to monitor a network, the system comprising:
   one or more memories; and
   one or more processors in communication with the one or more memories, the one or more processors configured to:
      determine a sample covariance matrix for the network;
      optimize an error metric based on the sample covariance matrix and a fixed probe budget value, wherein the error metric is associated with an error in estimating path latencies associated with the network and the fixed probe budget value is based on a maximum number of probes to monitor the network;
      determine the allocation of probes based on the optimized error metric, wherein the allocation of probes is associated with at least one feature vector of edge indicators for the network;
      compare the allocation of probes to at least one of a threshold associated with the fixed probe budget value or a threshold associated with a minimum number of probes to monitor the network to confirm the allocation of probes is a valid allocation; and
      store the allocation of probes in the one or more memories.

10. The system of claim 9, wherein the one or more processors are further configured to solve a semi-definite program using the fixed probe budget value.

11. The system of claim 9, wherein the one or more processors are further configured to use an approximation algorithm based on a Frank-Wolfe algorithm.

12. The system of claim 11, wherein the approximation algorithm comprises determining a gradient of a function of a minimum eigenvalue of the sample covariance matrix.

13. The system of claim 11, wherein the approximation algorithm comprises determining a gradient of a function of a trace of a matrix computed using an inverse of the sample covariance matrix.

14. The system of claim 9, wherein the error metric is associated with a maximum error in estimating the path latencies associated with the network.

15. The system of claim 9, wherein the error metric is associated with an average error in estimating the path latencies associated with the network.

16. The system of claim 9, wherein the allocation of probes is less than or equal to the probe budget value, and wherein the vector of edge indicators for the network indicates whether there is an edge between nodes in the network.

17. A non-transitory computer-readable medium storing instructions for determining an allocation of probes to monitor a network, that when executed by one or more processors, cause the one or more processors to:
- determine a sample covariance matrix for the network;
- optimize an error metric based on the sample covariance matrix and a fixed probe budget value, wherein the error metric is associated with an error in estimating path latencies associated with the network and the fixed probe budget value is based on a maximum number of probes to monitor the network;
- determine the allocation of probes based on the optimized error metric, wherein the allocation of probes is associated with at least one feature vector of edge indicators for the network; and
- compare the allocation of probes to at least one of a threshold associated with the fixed probe budget value or a threshold associated with a minimum number of probes to monitor the network to confirm the allocation of probes is a valid allocation.

18. The non-transitory computer-readable medium of claim 17, wherein the instructions, that when executed by one or more processors, further cause the one or more processors to use an approximation algorithm based on a Frank-Wolfe algorithm.

19. The non-transitory computer-readable medium of claim 18, wherein the approximation algorithm comprises determining a gradient of a function of a minimum eigenvalue of the sample covariance matrix or a function of a trace of a matrix computed using an inverse of the sample covariance matrix.

* * * * *